US012633780B2

(12) United States Patent
Hong

(10) Patent No.: US 12,633,780 B2
(45) Date of Patent: May 19, 2026

(54) REQUEST SENDING AND REQUEST RECEIVING METHODS AND DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 320 days.

(21) Appl. No.: 18/562,262

(22) PCT Filed: May 21, 2021

(86) PCT No.: PCT/CN2021/095297
§ 371 (c)(1),
(2) Date: Nov. 17, 2023

(87) PCT Pub. No.: WO2022/241780
PCT Pub. Date: Nov. 24, 2022

(65) Prior Publication Data
US 2025/0096611 A1      Mar. 20, 2025

(51) Int. Cl.
| | |
|---|---|
| *H04W 64/00* | (2009.01) |
| *H02J 50/20* | (2016.01) |
| *H02J 50/80* | (2016.01) |
| *H02J 50/90* | (2016.01) |
| *H04W 16/14* | (2009.01) |

(52) U.S. Cl.
CPC .............. *H02J 50/20* (2016.02); *H02J 50/80* (2016.02); *H02J 50/90* (2016.02); *H04W 16/14* (2013.01); *H04W 64/00* (2013.01)

(58) Field of Classification Search
CPC .. H02J 50/20; H02J 50/80; H02J 50/90; H02J 7/00034; H04W 16/14; H04W 64/00
USPC ........................................................ 455/456.2
See application file for complete search history.

(56) References Cited

U.S. PATENT DOCUMENTS

| | | | | |
|---|---|---|---|---|
| 2020/0021138 A1* | 1/2020 | Yeo | .......................... | H02J 50/12 |
| 2021/0013750 A1 | 1/2021 | Kronander et al. | | |

FOREIGN PATENT DOCUMENTS

| | | | | |
|---|---|---|---|---|
| CN | 103167588 A | 6/2013 | | |
| CN | 103380643 A | 10/2013 | | |
| CN | 103384952 A | 11/2013 | | |
| CN | 107819759 A * | 3/2018 | ......... | H04L 63/0876 |
| WO | WO 2020026412 A1 | 2/2020 | | |

OTHER PUBLICATIONS

PCT/CN2021/095297 International Search Report dated Feb. 16. 2022, 2 pages.
European Patent Application No. 21940233.6, Search and Opinion dated May 21, 2025, 8 pages.

* cited by examiner

*Primary Examiner* — Tanmay K Shah
(74) *Attorney, Agent, or Firm* — Cozen O'Connor

(57) ABSTRACT

A method for sending a request is performed by a terminal and includes: sending a radio charging request to a base station, wherein the radio charging request is configured to request the base station to wirelessly charge the terminal. The radio charging request may include radio charging assistance information or it may be a random access message.

19 Claims, 3 Drawing Sheets sending a radio charging request to a base station, wherein the radio charging request is configured to request the base station to wirelessly charge the terminal

S101 sending a radio charging request to a base station, wherein the radio charging request is configured to request the base station to wirelessly charge the terminal    S101

FIG. 1 sending a random access message to the base station, wherein the random access message carries the radio charging request, and the radio charging request is configured to request the base station to wirelessly charge the terminal    S201

FIG. 2 receiving a radio charging request from a terminal, wherein the radio charging request is configured to request the base station to wirelessly charge the terminal    S301

FIG. 3 device for sending request request sending module    401

FIG. 4 device for receiving request request receiving module    501

FIG. 5 device for receiving request request receiving module    501 charging determination module    601

FIG. 6

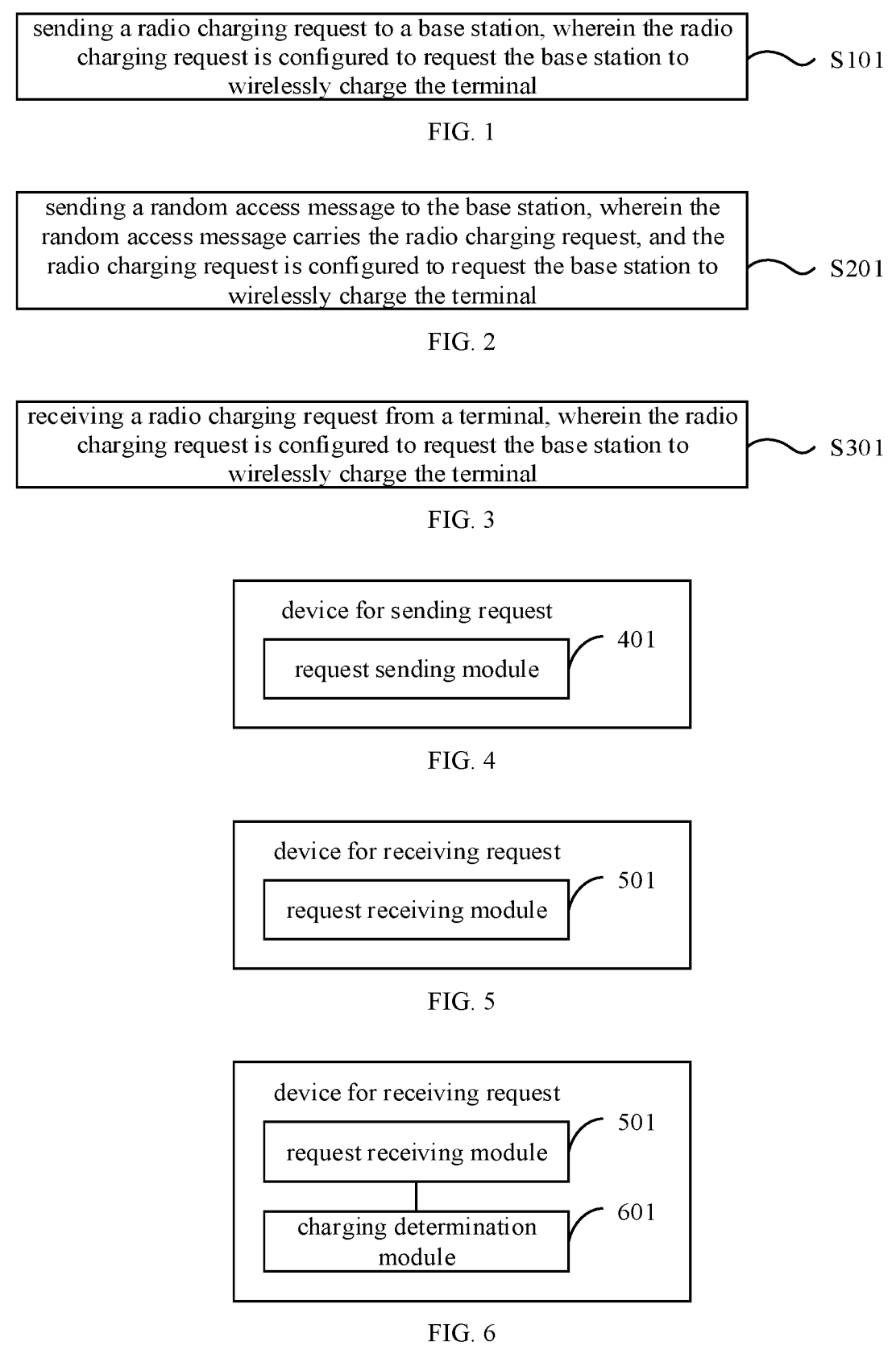

REQUEST SENDING AND REQUEST RECEIVING METHODS AND DEVICE

CROSS-REFERENCE TO RELATED APPLICATIONS

This application is a U.S. National Phase application of International Application No. PCT/CN2021/095297, filed May 21, 2021, the entire contents of which are incorporated herein by reference.

FIELD

The present disclosure relates to the field of wireless communication technology, and particularly to a method for sending a request, a method for receiving a request, a device for sending a request, a device for receiving a request, a communication device and a computer readable storage medium.

BACKGROUND

With the development of a cellular mobile communication technology, especially a millimeter wave communication technology, an increasing number of antennas may be configured on a single base station. For example, the implementation of a Massive MIMO (Multiple Input Multiple Output) technology in 5G relies on a large number of antennas. In addition to providing Massive MIMO technology, base stations having a large number of antennas may also provide radio charging services for terminals.

SUMMARY

According to embodiments of the present disclosure, there is provided a method for sending a request, which is performed by a terminal, and includes: sending a radio charging request to a base station. The radio charging request is configured to request the base station to wirelessly charge the terminal.

According to embodiments of the present disclosure, there is provided a method for receiving a request, which is performed by a base station, and includes: receiving a radio charging request from a terminal. The radio charging request is configured to request the base station to wirelessly charge the terminal.

According to embodiments of the present disclosure, there is provided a communication device, which includes: a processor; and a memory storing a computer program. The computer program, when executed by the processor, causes the method for sending the request to be implemented.

According to embodiments of the present disclosure, there is provided a communication device, which includes: a processor; and a memory storing a computer program. The computer program, when executed by the processor, causes the method for receiving the request to be implemented.

According to embodiments of the present disclosure, there is provided a non-transitory computer readable storage medium having stored therein a computer program. The computer program, when executed by a processor, causes steps in the method for sending the request to be implemented.

According to embodiments of the present disclosure, there is provided a non-transitory computer readable storage medium having stored therein a computer program. The computer program, when executed by a processor, causes steps in the method for receiving the request to be implemented.

BRIEF DESCRIPTION OF THE DRAWINGS

In order to clearly illustrate embodiments of the present disclosure, a brief introduction of drawings to be used in descriptions of embodiments of the present disclosure is given below. Apparently, the drawings in the following descriptions only involve some embodiments of the present disclosure, and other drawings can be obtained by those skilled in the art according to these drawings without creative labors.

FIG. 1 is a schematic flow chart illustrating a method, performed by a terminal, for sending a request according to embodiments of the present disclosure.

FIG. 2 is a schematic flow chart illustrating a method for sending a request according to embodiments of the present disclosure.

FIG. 3 is a schematic flow chart illustrating a method, performed by a base station, for receiving a request according to embodiments of the present disclosure.

FIG. 4 is a schematic block diagram illustrating a device for sending a request, applied to a terminal, according to embodiments of the present disclosure.

FIG. 5 is a schematic block diagram illustrating a device for receiving a request, applied to a base station, according to embodiments of the present disclosure.

FIG. 6 is a schematic block diagram illustrating a device for receiving a request according to embodiments of the present disclosure.

DETAILED DESCRIPTION

Figure 7:
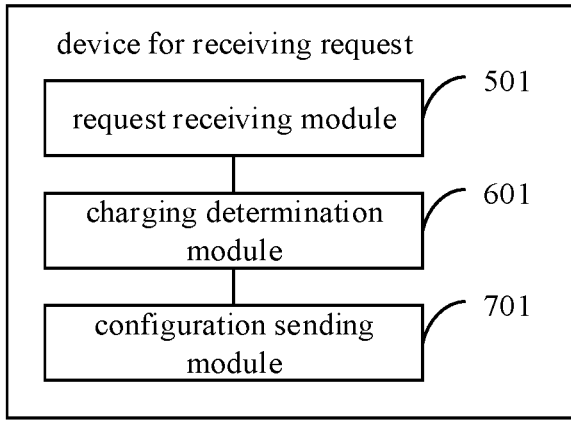
FIG. 7 is a schematic block diagram illustrating a device for receiving a request according to embodiments of the present disclosure.

Embodiments of the present disclosure will be described clearly and thoroughly with reference to accompanying drawings. Apparently, the embodiments described herein are only some embodiments, rather than all embodiments of the present disclosure. Other embodiments obtainable by those skilled in the art based on the embodiments described herein without creative labors shall belong to the protection scope of the present disclosure.

Terms used in embodiments of the present disclosure are only for the purpose of describing specific embodiments, and should not be construed to limit embodiments of the present disclosure. As used in embodiments of the present disclosure and the appended claims, "a/an" and "the" in a singular form are intended to include plural forms, unless clearly indicated in the context otherwise. It should also be understood that, the term "and/or" used herein represents and includes any one of associated listed items or all possible combinations of more than one associated listed items.

It should be understood that terms such as "first," "second" and "third" may be used in embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "if" may be construed to mean "when", "upon" or "in response to determining", depending on the context.

For the purposes of brevity and ease of understanding, terms "greater than" or "less than", "higher than" or "lower than" are used herein for indicating size relationships. However, it may be understood for a person skilled in the art that the term "greater than" also covers a meaning of "greater than or equal to", the term "less than" also covers a meaning of "less than or equal to"; the term "higher than" covers a meaning of "higher than or equal to", and the term "lower than" also covers a meaning of "lower than or equal to".

FIG. 1 is a schematic flow chart illustrating a method for sending a request according to embodiments of the present disclosure. The method for sending the request shown in embodiments of the present disclosure may be performed by a terminal, which, as a user equipment, may communicate with a base station and may also communicate with a core network.

The terminal includes, but is not limited to, a communication device such as a mobile phone, a tablet computer, a wearable device, a sensor, an Internet of Things device, etc. The base station includes, but is not limited to, a base station in a communication system such as a 4G base station, a 5G base station, a 6G base station, etc.

In an embodiment, the base station may be a base station corresponding to a cell where the terminal is currently located, and further, the base station may be wirelessly charging the terminal.

It should be noted that wireless charging involved in all embodiments of the present disclosure refers to that the base station wirelessly charge the terminal, where the wireless charging is performed via any one of: electromagnetic induction, electromagnetic resonance, or radio frequency.

In an embodiment, the base station charges the terminal via the radio frequency, specifically via air charge.

The air charge refers a technology in which the base station may transmit energy to the terminal in the form of a millimeter wave and a narrow bandwidth through a plurality of antennas, and the terminal may receive the energy through a miniature beacon antenna and convert the same into electric energy, thereby achieving charging. The base station has a capability of air charge, which may further mean that the base station may determine a position of the terminal, and then transmit the energy to the terminal at the position for charging.

As shown in FIG. 1, the method for sending the request may include a following step.

In step S101, a radio charging request is sent to a base station, and the radio charging request is configured to request the base station to wirelessly charge the terminal.

In an embodiment, the terminal may send the radio charging request to the base station. A trigger condition for the terminal to send the radio charging request to the base station may be determined by at least one of: an indication from the base station, independent determination by the terminal, or a communication protocol between the terminal and the base station.

For example, the trigger condition is that a current remaining electricity of the terminal is lower than an electricity threshold (which may be a specific electricity value or an electricity percentage). In other words, when the current remaining electricity of the terminal is lower than the electricity threshold, the terminal sends the radio charging request to the base station. For example, in a case where the terminal independently determines the trigger condition, the terminal may independently determine the electricity threshold. For another example, in a case where the base station indicates the trigger condition, the base station may indicate the electricity threshold.

Of course, the trigger condition is not limited to that the current remaining electricity of the terminal is lower than the electricity threshold, and the trigger condition may be specifically set as required. For example, the trigger condition may be that a duration from a current moment to a moment when a last radio charging request is sent to the base station is greater than a period threshold.

According to embodiments of the present disclosure, the terminal may send the radio charging request to the base station, so that the base station may determine that the terminal needs to be wirelessly charged based on the radio charging request, so as to wirelessly charge the terminal in time.

In an embodiment, the radio charging request carries radio charging assistance information, and the radio charging assistance information is configured to assist the base station to wirelessly charge the terminal.

By carrying the radio charging assistance information in the radio charging request, the base station may be provided with a reference to facilitate the base station to determine whether to wirelessly charge the terminal and how to wirelessly charge the terminal. It should be noted that the radio charging assistance information is only used to assist the base station to wirelessly charge the terminal, but is not used to indicate the base station to wirelessly charge the terminal. The base station may determine how to wirelessly charge the terminal with reference to the assistance information, or may determine how to wirelessly charge the terminal without reference to the assistance information.

In an embodiment, the radio charging assistance information includes at least one of: charging direction information, charging antenna information, a radio charging capability, spatial state information, or a radio charging state.

In an embodiment, the charging direction information is determined based on at least one of: a position of the terminal relative to the base station, absolute positions of the terminal and the base station, or a beam for a communication between the terminal and the base station.

For example, a relative direction may be determined as the charging direction based on the position of the terminal relative to the base station; for example, an absolute direction may be determined as the charging direction based on the absolute positions of the terminal and the base station; for example, a direction of the beam used for the communication between the terminal and the base station (which may be a receiving beam of the terminal or a transmitting beam of the base station) may be determined as the charging direction. After the charging direction is determined, the base station sends a radio charging signal in the charging direction to wirelessly charge the terminal.

In an embodiment, the radio charging capability includes at least one of: a radio charging power (a power supported by the terminal for receiving the radio charging signal), a radio charging frequency domain resource (a frequency band where the terminal is able to receive the radio charging signal), or a radio charging time domain resource (a duration within which the terminal is able to receive the radio charging signal).

After receiving the radio charging capability, the base station may charge the terminal based on the radio charging capability. For example, a power of the radio charging signal may be set as the radio charging power. For example, the radio charging signal may be sent to the terminal in the radio charging frequency domain resource. For example, the radio charging signal may be sent to the terminal in the radio charging time domain resource.

In an embodiment, the spatial state information includes at least one of: a speed of movement, a direction of movement, or a position.

The terminal may detect its own spatial state information, for example, may detect its own speed of movement, direction of movement, and position (which may be a planar two-dimensional position or a three-dimensional position). The base station may determine whether to wirelessly charge the terminal and how to wirelessly charge the terminal based on the spatial state information.

For example, the spatial state information includes the position, the base station may determine a distance from the terminal according to the position of the base station and the position of the terminal, and the base station will wirelessly charge the terminal in a case where the distance is less than or equal to a distance threshold value, otherwise, the base station does not wirelessly charge the terminal. Further, when the base station determines to wirelessly charge the terminal, a power for wirelessly charging the terminal may also be determined based on the distance, for example, the power may be positively related to the distance, and an upper limit of the power is a maximum value of the radio charging power supported by the terminal.

For example, the spatial state information includes the speed of the movement, and the terminal will be wirelessly charged in a case where the speed of the movement is less than or equal to a speed threshold value, otherwise, the terminal will not be wirelessly charged. Further, when it is determined to wirelessly charge the terminal, a speed of change of the direction in which the terminal is wirelessly charged may be determined based on the speed of the movement to ensure that the radio charging direction may point to the moving terminal.

In an embodiment, the radio charging state includes at least one of: a current remaining electricity, a required charging electricity, or a required charging duration.

The base station may determine how to wirelessly charge the terminal based on the radio charging state of the terminal. For example, the radio charging state includes the required charging duration, then the base station may maintain the duration to wirelessly charge the terminal. For example, the radio charging state includes the required charging electricity, then the base station may determine the charging duration based on the required charging electricity, the power of the radio charging signal and a radio charging efficiency, so that the terminal may be fully charged after the terminal is charged wirelessly using the radio charging signal of such a power for the charging duration.

FIG. 2 is a schematic flow chart illustrating a method for sending a request according to embodiments of the present disclosure. As shown in FIG. 2, sending the radio charging request to the base station includes a following step.

In step S201, a random access message is sent to the base station, and the random access message carries the radio charging request.

In an embodiment, the terminal may carry the radio charging request in the random access message sent to the base station. Accordingly, on the one hand, it is not necessary to separately send the radio charging request, which is beneficial to saving communication resources; on the other hand, the radio charging request may be sent during a random access process, so that the base station determines in time that the terminal needs to be wirelessly charged.

In an embodiment, the random access message includes at least one of: a first random access message Msg1, a third random access message Msg3, or a fifth random access message Msg5.

It should be noted that the above random access messages are mainly for a four-step random access, and in a two-step random access, the random access message may be MsgA. Furthermore, the radio charging request may be sent once, or may be sent for multiple times, for example, the radio charging request is carried in each of the above-mentioned several random access messages.

In an embodiment, in a case where the terminal is in an idle state or in an inactive state, the first random access message includes a preamble of a random access, and the preamble is configured to request the base station to wirelessly charge the terminal. The preamble may be configured by the base station to the terminal specifically for requesting the wireless charging.

In an embodiment, in the case where the terminal is in the idle state, the third random access message includes a radio resource control setup request (RRCSetupRequest) message or a radio resource control reestablishment request (RRCReestablishmentRequest) message; and the fifth random access message includes a radio resource control setup completion (RRCSetupComplete) message or a radio resource control reestablishment completion (RRCReestablishmentComplete) message.

In an embodiment, in the case where the terminal is in the inactive state, the third random access message includes a radio resource control resume request (RRCResumeRequest) message; and the fifth random access message includes a radio resource control resume completion (RRCResumeComplete) message.

In an embodiment, in a case where the terminal is in a connected state, the radio charging request is carried in user equipment assistance information (UEAssistanceInformation) or in a new signaling which may for example be referred to as a radio charging request (RadioChargingRequest) signaling.

In an embodiment, the radio charging request is carried in at least one of: a radio resource control (RRC) layer signaling, a medium access control (MAC) layer signaling, or a physical (PHY) layer signaling.

FIG. 3 is a schematic flow chart illustrating a method for receiving a request according to embodiments of the present disclosure. The method for receiving the request shown in embodiments of the present disclosure may be performed by a base station which may communicate with a terminal as a user equipment and may also communicate with a core network.

The terminal includes, but is not limited to, a communication device such as a mobile phone, a tablet computer, a wearable device, a sensor, an Internet of Things device, etc. The base station includes, but is not limited to, a base station in a communication system such as a 4G base station, a 5G base station, a 6G base station, etc.

As shown in FIG. 3, the method for receiving the request may include a following step.

In step S301, the radio charging request is received from the terminal, and the radio charging request is configured to request the base station to wirelessly charge the terminal.

According to embodiments of the present disclosure, the terminal may send the radio charging request to the base station, so that the base station may determine that the terminal needs to be wirelessly charged based on the radio charging request, so as to wirelessly charge the terminal in time.

In an embodiment, the radio charging request carries radio charging assistance information. The method further includes: determining, based on a state of the base station and/or the radio charging assistance information, at least one of: whether to wirelessly charge the terminal; or a radio charging configuration for wirelessly charging the terminal.

The base station may determine whether to wirelessly charge the terminal and the radio charging configuration for wirelessly charging the terminal only based on a state of the base station itself; the base station may also determine whether to wirelessly charge the terminal and the radio charging configuration for wirelessly charging the terminal only based on the radio charging assistance information; and the base station may also determine whether to wirelessly charge the terminal and the radio charging configuration for wirelessly charging the terminal based on the state of the base station and the radio charging assistance information. How the determination is performed in detail is described in the following embodiments.

In an embodiment, the state of the base station includes at least one of: a load of the base station, or usage of antennas of the base station.

In an embodiment, the state of the base station includes at least one of: charging direction information, charging antenna information, a radio charging capability, spatial state information, or a radio charging state.

Based on the charging direction information, the base station may determine a charging direction, and send a radio charging signal in the charging direction to wirelessly charge the terminal.

Based on the charging antenna information, the base station may determine an antenna used by the terminal to receive the charging signal, and send the charging signal along the antenna to wirelessly charge the terminal.

Based on the radio charging capability, the base station may select a configuration matching a radio charging capability of the terminal as the radio charging configuration and send it to the terminal. For example, the radio charging configuration includes a radio charging power, and the base station may select a power whose difference from the radio charging power is less than a preset difference as a power of the radio charging signal. For example, the radio charging configuration includes a radio charging frequency, and the base station may select a same frequency as the radio charging frequency as a frequency of the radio charging signal.

Based on the spatial state information which for example includes a speed of movement of the terminal, the base station may determine to wirelessly charge the terminal in a case that the speed of the movement is less than or equal to a speed threshold value, otherwise, the base station does not wirelessly charge the terminal.

Based on the radio charging state which for example includes a required charging duration, the base station may use this duration as a duration of the wireless charging.

In an embodiment, the state of the base station includes the load of the base station, and determining the radio charging configuration for wirelessly charging the terminal based on the state of the base station includes: determining available resources based on the load of the base station; and determining a resource for wirelessly charging the terminal among the available resources.

The base station may also determine whether to wirelessly charge the terminal based on its own load, for example, in a case where the load is lower than a load threshold value, the base station wirelessly charges the terminal, otherwise, the base station does not wirelessly charge the terminal.

The base station may determine available resources, such as a frequency domain resource and a time domain resource, based on its own load, and select a resource for wirelessly charging the terminal from the available resources. The available resources include but are not limited to resources which have not been configured to other terminals by the base station.

In an embodiment, the state of the base station includes usage of antennas of the base station, and determining the radio charging configuration for wirelessly charging the terminal based on the state of the base station includes: determining antennas available for wireless charging based on the usage of antennas of the base station; and determining an antenna for wirelessly charging the terminal among the antennas available for wireless charging.

The base station may also determine the antennas available for wireless charging based on the usage of its own antennas. A condition for determining the antennas available for wireless charging includes, but is not limited to, whether an antenna is currently used (available for wireless charging if it is not used) and a usage frequency of an antenna (available for wireless charging if its usage frequency is lower than a frequency threshold).

For example, the terminal is wirelessly charged in a case that there exists an antenna available for wireless charging, otherwise, the terminal is not wirelessly charged.

In a case where it is determined to wirelessly charge the terminal, the base station selects an antenna from the antennas available for wireless charging to wirelessly charge the terminal. For example, a condition for selecting an antenna includes, but is not limited to, whether the antenna will be used in a future duration (the antenna is selected in a case that it will not be used in a future duration), and whether the antenna corresponds to an antenna direction in which the terminal receives the radio charging signal (the antenna is selected in a case that it corresponds to the antenna direction).

In an embodiment, the radio charging assistance information includes a radio charging capability of the terminal, and determining whether to wirelessly charge the terminal based on the radio charging assistance information includes: determining whether the radio charging capability of the base station matches the radio charging capability of the terminal; and determining to wirelessly charge the terminal in a case where the radio charging capability of the base station matches the radio charging capability of the terminal.

After determining the radio charging capability of the terminal, the base station may determine whether the radio charging capability of the base station itself matches the radio charging capability of the terminal. For example, the radio charging capability of the terminal includes a radio charging power $P1$ and a radio charging frequency $f1$, and the base station may determine whether the base station itself may wirelessly charge the terminal in the $P1$ power and whether the base station may send the radio charging signal to the terminal at the frequency $f1$; in a case that the base station cannot wirelessly charge the terminal in the $P1$ power, and/or cannot send the radio charging signal to the terminal at the frequency $f1$, the base station determines that the radio charging capability of the base station itself does not match the radio charging capability of the terminal, otherwise, the base station determines that the radio charging capability of the base station itself matches the radio charging capability of the terminal.

After it is determined to wirelessly charge the terminal, the radio charging configuration may be further determined based on the radio charging capability of the terminal. For example, the power of the radio charging signal may be set as the radio charging power; for example, the radio charging signal may be sent to the terminal at the radio charging frequency.

In an embodiment, the radio charging assistance information includes spatial state information of the terminal, and determining whether to wirelessly charge the terminal based on the radio charging assistance information includes: determining an efficiency for wirelessly charging the terminal based on spatial state information of the base station and the spatial state information of the terminal; and determining to wirelessly charge the terminal in a case where the efficiency for wirelessly charging the terminal is higher than a preset efficiency.

After determining the spatial state information of the terminal, the base station may determine the efficiency for wirelessly charging the terminal based on the spatial state information of the base station and the spatial state information of the terminal. For example, the spatial state information includes a position, and the base station may determine a distance from the terminal based on the position of the base station itself and the position of the terminal, and then determine the efficiency for wirelessly charging the terminal based on the distance. The base station may determine an obstacle between the base station and the terminal based on their positions, and determine the efficiency for wirelessly charging the terminal based on conditions (density, height, etc.) of the obstacle.

In a case where the efficiency for wirelessly charging the terminal is higher than a preset efficiency, the terminal will be wirelessly charged, otherwise, the terminal will not be wirelessly charged. Accordingly, it is beneficial to avoid that the terminal is wirelessly charged in a low efficiency, so as to avoid the waste of time and radio charging resources.

In an embodiment, the method further includes: sending the radio charging configuration to the terminal in a case where the radio charging configuration for wirelessly charging the terminal is determined.

In a case where the base station determines to wirelessly charge the terminal, the base station may further determine the radio charging configuration, such as the radio charging power, the radio charging frequency, etc., and send the radio charging configuration to the terminal, so that the terminal may receive the radio charging signal sent by the base station based on the radio charging configuration, so that the terminal is wirelessly charged.

In an embodiment, the radio charging configuration is carried in at least one of: a radio resource control layer signaling, a medium access control layer signaling, or a physical layer signaling.

In an embodiment, the radio charging configuration is carried in at least one of: a radio access control reconfiguration (RRCReconfiguration) signaling, a radio access control setup (RRCSetup) signaling, a radio access control reestablishment (RRCReestablishment) signaling, or a radio access control resume (RRCResume) signaling.

Corresponding to the foregoing embodiments of the method for sending the request and the method for receiving the request, the present disclosure also provides embodiments of a device for sending a request and a device for receiving a request.

FIG. 4 is a schematic block diagram illustrating a device for sending a request according to embodiments of the present disclosure. The device for sending the request shown in embodiments of the present disclosure may be applied to a terminal, which, as a user equipment, may communicate with a base station and may also communicate with a core network.

The terminal includes, but is not limited to, a communication device such as a mobile phone, a tablet computer, a wearable device, a sensor, an Internet of Things device, etc. The base station includes, but is not limited to, a base station in a communication system such as a 4G base station, a 5G base station, a 6G base station, etc.

As shown in FIG. 4, the device for sending the request may include: a request sending module 401.

The request sending module 401 is configured to send a radio charging request to a base station. The radio charging request is configured to request the base station to wirelessly charge the terminal.

In an embodiment, the radio charging request carries radio charging assistance information. The radio charging assistance information is configured to assist the base station to wirelessly charge the terminal.

In an embodiment, the radio charging assistance information includes at least one of: charging direction information, charging antenna information, a radio charging capability, spatial state information, or a radio charging state.

In an embodiment, the charging direction information is determined based on at least one of: a position of the terminal relative to the base station, absolute positions of the terminal and the base station, or a beam for a communication between the terminal and the base station.

In an embodiment, the radio charging capability includes at least one of: a radio charging power, a radio charging frequency domain resource, or a radio charging time domain resource.

In an embodiment, the spatial state information includes at least one of: a speed of movement, a direction of movement, or a position.

In an embodiment, the radio charging state includes at least one of: a current remaining electricity, a required charging electricity, or a required charging duration.

In an embodiment, the request sending module is configured to send a random access message to the base station. The random access message carries the radio charging request.

In an embodiment, the random access message includes at least one of: a first random access message, a third random access message, or a fifth random access message.

In an embodiment, the terminal is in an idle state, the first random access message includes a preamble of a random access, and the preamble is configured to request the base station to wirelessly charge the terminal; the third random access message includes a radio resource control setup request message or a radio resource control reestablishment request message; and the fifth random access message includes a radio resource control setup completion message or a radio resource control reestablishment completion message.

In an embodiment, the terminal is in an inactive state, the first random access message includes a preamble of a random access, and the preamble is configured to request the base station to wirelessly charge the terminal; the third random access message includes a radio resource control resume request message; and the fifth random access message includes a radio resource control resume completion message.

In an embodiment, the terminal is in a connected state, and the radio charging request is carried in user equipment assistance information or in a new signaling.

In an embodiment, the radio charging request is carried in at least one of: a radio resource control layer signaling, a medium access control layer signaling, or a physical layer signaling.

FIG. 5 is a schematic block diagram illustrating a device for receiving a request according to embodiments of the present disclosure. The device for receiving the request shown in embodiments of the present disclosure may be applied to a base station which may communicate with a terminal as a user equipment and may also communicate with a core network.

The terminal includes, but is not limited to, a communication device such as a mobile phone, a tablet computer, a wearable device, a sensor, an Internet of Things device, etc. The base station includes, but is not limited to, a base station in a communication system such as a 4G base station, a 5G base station, a 6G base station, etc.

As shown in FIG. 5, the device for receiving the request may include: a request receiving module 501.

The request receiving module 501 is configured to receive a radio charging request from a terminal. The radio charging request is configured to request the base station to wirelessly charge the terminal.

FIG. 6 is a schematic block diagram illustrating a device for receiving a request according to embodiments of the present disclosure. As shown in FIG. 6, the radio charging request carries radio charging assistance information, and the device further include: a charging determination module 601.

The charging determination module 601 is configured to determine, based on a state of the base station and/or the radio charging assistance information, at least one of: whether to wirelessly charge the terminal; or a radio charging configuration for wirelessly charging the terminal.

In an embodiment, the state of the base station includes at least one of: a load of the base station, or usage of antennas of the base station.

In an embodiment, the state of the base station includes at least one of: charging direction information, charging antenna information, a radio charging capability, spatial state information, or a radio charging state.

In an embodiment, the state of the base station includes the load of the base station, and the charging determination module is configured to: determine available resources based on the load of the base station; and determine a resource for wirelessly charging the terminal among the available resources.

In an embodiment, the state of the base station includes the usage of antennas of the base station, and the charging determination module is configured to: determine antennas available for wireless charging based on the usage of antennas of the base station; and determine an antenna for wirelessly charging the terminal among the antennas available for wireless charging.

In an embodiment, the radio charging assistance information includes a radio charging capability of the terminal, and the charging determination module is configured to: determine whether a radio charging capability of the base station matches the radio charging capability of the terminal; and determine to wirelessly charge the terminal in a case where the radio charging capability of the base station matches the radio charging capability of the terminal.

In an embodiment, the radio charging assistance information includes spatial state information of the terminal, and the charging determination module is configured to: determine an efficiency for wirelessly charging the terminal based on a spatial state information of the base station and the spatial state information of the terminal; and determine to wirelessly charge the terminal in a case where the efficiency for wirelessly charging the terminal is higher than a preset efficiency.

FIG. 7 is a schematic block diagram illustrating a device for receiving a request according to embodiments of the present disclosure. As shown in FIG. 7, the device further include: a configuration sending module 701.

The configuration sending module 701 is configured to send a radio charging configuration to the terminal in a case where the radio charging configuration for wirelessly charging the terminal is determined.

In an embodiment, the radio charging configuration is carried in at least one of: a radio resource control layer signaling, a medium access control layer signaling, or a physical layer signaling.

In an embodiment, the radio charging configuration is carried in at least one of: a radio access control reconfiguration signaling, a radio access control setup signaling, a radio access control reestablishment signaling, or a radio access control resume signaling.

With respect to the devices as described in the above embodiments, specific manners of individual modules for performing operations therein have been described in detail in the embodiments of the related methods, which will not be elaborated herein.

With respect to the device embodiments, since they substantially correspond to the method embodiments, reference may be made to the description of the method embodiments for relevant parts. The above-described device embodiments are merely for the purpose of illustration, in which the modules described as separate components may be or may not be physically separated, and the components shown as modules may be or may not be physical modules, that is, they may be either located at one place or distributed onto a plurality of network modules. The object of embodiments of the present disclosure may be achieved by some or all of the modules in accordance with practical requirements, which would be appreciated and executable by those skilled in the art without creative efforts.

Embodiments of the present disclosure also provide a communication device, which includes: a processor; and a memory storing a computer program. The computer program, when executed by the processor, causes the method for sending the request according to any of the above embodiments to be implemented.

Embodiments of the present disclosure also provide a communication device, which includes: a processor; and a memory for storing a computer program. The computer program, when executed by the processor, causes the method for receiving the request according to any of the above embodiments to be implemented.

Embodiments of the present disclosure also provide a computer readable storage medium having stored therein a computer program that, when executed by a processor, causes steps in the method for sending the request according to any of the above embodiments to be implemented.

Embodiments of the present disclosure also provide a computer readable storage medium having stored therein a computer program that, when executed by a processor, causes steps in the method for receiving the request according to any of the above embodiments to be implemented.

Figure 8:
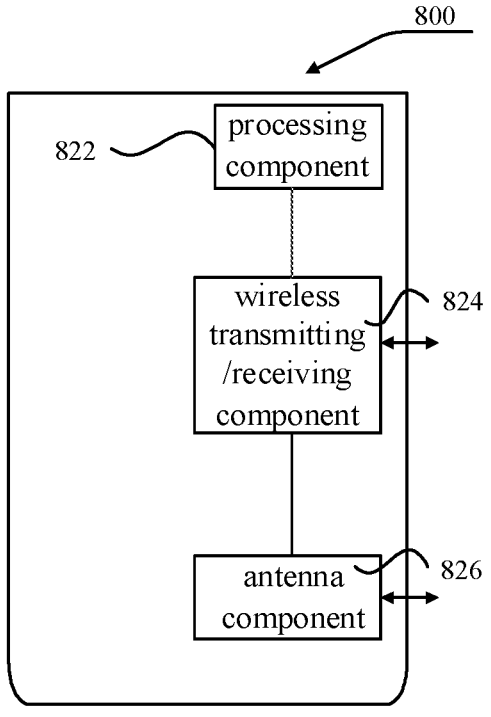
FIG. 8 is a schematic block diagram illustrating a device for sending a request according to embodiments of the present disclosure.

As shown in FIG. 8, FIG. 8 is a schematic block diagram illustrating a device 800 for receiving a request according to embodiments of the present disclosure. The device 800 may be provided as a base station. Referring to FIG. 8, the device 800 includes a processing component 822, a wireless transmitting/receiving component 824, an antenna component 826, and a signal processing part specific to a wireless interface. The processing component 822 may further include one or more processors. One of the processors in the processing component 822 may be configured to implement the method for receiving the request as described in any one of the above embodiments.

Figure 9:
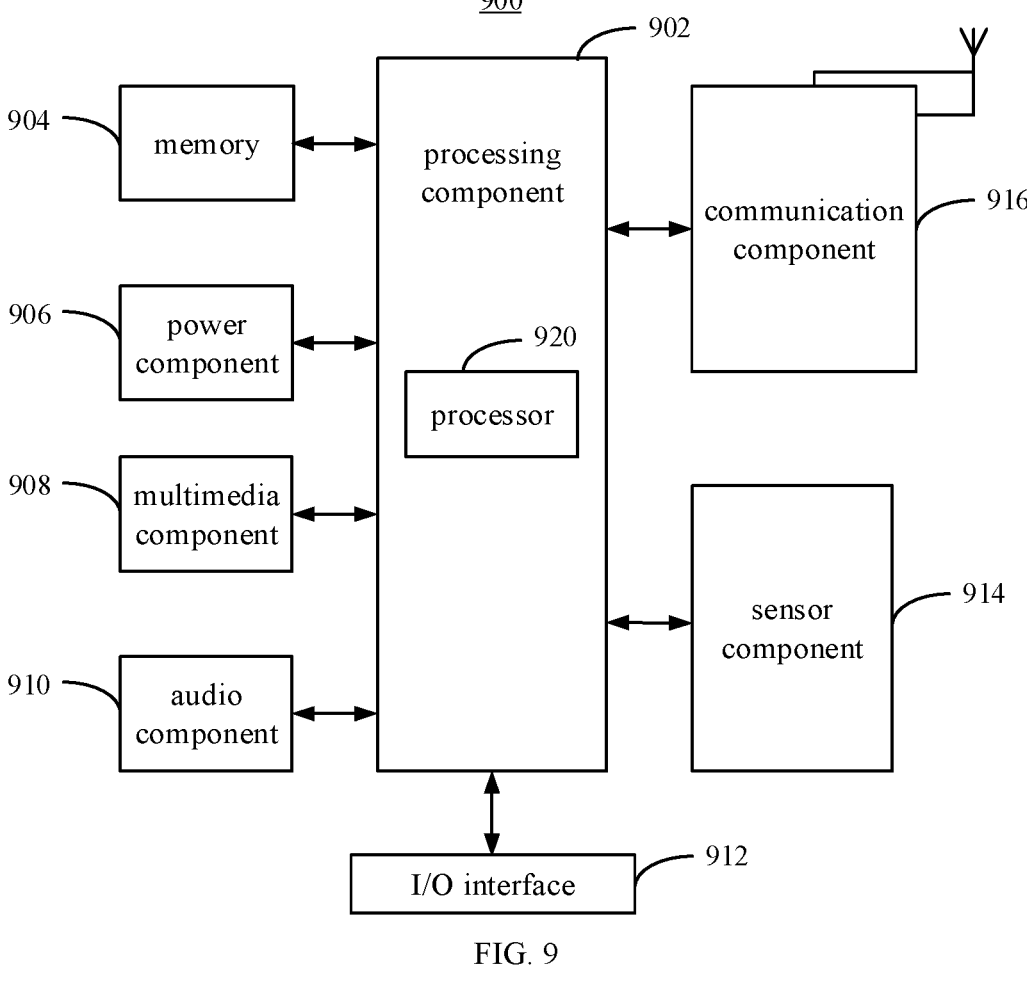
FIG. 9 is a schematic block diagram illustrating a device for receiving a request according to embodiments of the present disclosure.

FIG. 9 is a schematic block diagram illustrating a device 900 for sending a request according to embodiments of the present disclosure. For example, the device 900 may be a mobile phone, a computer, a digital broadcast terminal, a messaging device, a game console, a tablet device, a medical device, a fitness device, a personal digital assistant, or the like.

Referring to FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions to perform all or part of the steps in the above described methods for sending the request. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may include a power management system, one or more power sources, and any other components associated with generation, management, and distribution of power in the device 900.

The multimedia component 908 includes a screen providing an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and/or the rear camera may receive an external multimedia datum while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone ("MIC") configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, a button and the like. The button may include, but not limited to, a home button, a volume button, a starting button, and a locking button.

The sensor component 914 includes one or more sensors to provide status assessments of various aspects of the device 900. For instance, the sensor component 914 may detect an open/closed status of the device 900, relative positioning of components, e.g., the display and the keypad, of the device 900, a change in position of the device 900 or a component of the device 900, a presence or absence of user contact with the device 900, an orientation or an acceleration/deceleration of the device 900, and a change in temperature of the device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may further include an accelerometer sensor, a gyroscope sensor, a magnetic sensor, a pressure sensor, or a temperature sensor.

The communication component 916 is configured to facilitate communication, wired or wirelessly, between the device 900 and other devices. The device 900 can access a wireless network based on a communication standard, such as WiFi®, 2G, or 3G, 4G LTE®, 5G NR or a combination thereof. In an embodiment, the communication component 916 receives a broadcast signal or broadcast associated information from an external broadcast management system via a broadcast channel. In an embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for sending the request.

In embodiments, there is further provided a non-transitory computer-readable storage medium (such as the memory 904) including instructions that may be executed by the processor 920 of the device 900, to cause the above-described methods for sending the request to be performed. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including common knowledge or conventional technical means known in the art but not disclosed in the present disclosure. The specification and examples should be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. The scope of the present disclosure is only limited by the appended claims.

It is to be noted that in this context, relational terms such as first and second are used solely to distinguish one entity or operation from another entity or operation, it does not necessarily require or imply any such actual relationship or sequence between these entities or operations. The term "include", "comprise" or any other variation thereof is intended to cover a non-exclusive inclusion, so that a process, method, article or device that includes a series of elements does not only include those elements, but also includes other elements that are not explicitly listed, or also includes elements inherent in such a process, method, article or device. Without further restrictions, an element defined by the statement "including a . . . " does not exclude the existence of another identical element in the process, method, article or device that includes the element.

The methods and devices provided by the embodiments of the present disclosure have been described in detail above, and specific examples are used to illustrate the principle and implementation of the present disclosure. The description of the above embodiments is only used to help understand the methods and core ideas of the present disclosure. At the same time, for those skilled in the art, there will be some changes in the specific implementation and application scope according to the idea of the present disclosure. In summary, the content of the specification should not be construed as a limitation on the present disclosure.

What is claimed is:

1. A method for sending a request, performed by a terminal, comprising:
sending a radio charging request to a base station, wherein the radio charging request is configured to request the base station to wirelessly charge the terminal, the radio charging request carries radio charging assistance information, the radio charging assistance information is configured to assist the base station to wirelessly charge the terminal, the radio charging assistance information comprises a radio charging capability, and radio charging capability comprises one or more of: a radio charging power, a radio charging frequency domain resource, or a radio charging time domain resource,
wherein the radio charging capability is configured to assist the base station to determine whether a radio charging capability of the base station matches the radio charging capability of the terminal, and determine to wirelessly charge the terminal in a case where the radio charging capability of the base station matches the radio charging capability of the terminal.

2. The method of claim 1, wherein the radio charging assistance information comprises at least one of:
charging direction information, charging antenna information, spatial state information, or a radio charging state.

3. The method of claim 2, wherein the charging direction information is determined based on at least one of: a position of the terminal relative to the base station, absolute positions of the terminal and the base station, or a beam for a communication between the terminal and the base station;
the spatial state information comprises at least one of: a speed of movement, a direction of movement, or a position; and
the radio charging state comprises at least one of: a current remaining electricity, a required charging electricity, or a required charging duration.

4. The method of claim 1, wherein sending the radio charging request to the base station comprises:
sending a random access message to the base station, wherein the random access message carries the radio charging request.

5. The method of claim 4, wherein the random access message comprises at least one of:
a first random access message, a third random access message, or a fifth random access message.

6. The method of claim 5, wherein the terminal is in an idle state, the first random access message comprises a preamble of a random access, and the preamble is configured to request the base station to wirelessly charge the terminal; the third random access message comprises a radio resource control setup request message or a radio resource control reestablishment request message; and the fifth random access message comprises a radio resource control setup completion message or a radio resource control reestablishment completion message,
or
the terminal is in an inactive state, the first random access message comprises a preamble of a random access, and the preamble is configured to request the base station to wirelessly charge the terminal; the third random access message comprises a radio resource control resume request message; and the fifth random access message comprises a radio resource control resume completion message.

7. The method of claim 1, wherein the terminal is in a connected state, and the radio charging request is carried in user equipment assistance information or in a new signaling.

8. The method of claim 1, wherein the radio charging request is carried in at least one of:
a radio resource control layer signaling, a medium access control layer signaling, or a physical layer signaling.

9. A non-transitory computer readable storage medium having stored therein a computer program, wherein the computer program, when executed by a processor, causes steps in the method for sending the request according to claim 1 to be implemented.

10. A method for receiving a request, performed by a base station, comprising:
receiving a radio charging request from a terminal, wherein the radio charging request is configured to request the base station to wirelessly charge the terminal, the radio charging request carries radio charging assistance information, and the radio charging assistance information comprises a radio charging capability of the terminal;

determining whether a radio charging capability of the base station matches the radio charging capability of the terminal; and determining to wirelessly charge the terminal in a case where the radio charging capability of the base station matches the radio charging capability of the terminal.

11. The method of claim 10, wherein the method further comprises:

determining, based on a state of the base station and/or the radio charging assistance information, at least one of:

whether to wirelessly charge the terminal; or a radio charging configuration for wirelessly charging the terminal.

12. The method of claim 11, wherein the state of the base station comprises at least one of:

a load of the base station, usage of antennas of the base station, charging direction information, charging antenna information, spatial state information, or a radio charging state.

13. The method of claim 11, wherein the state of the base station comprises at least one of a load of the base station or usage of antennas of the base station, and determining the radio charging configuration for wirelessly charging the terminal based on the state of the base station comprises at least one of:

determining available resources based on the load of the base station; and determining a resource for wirelessly charging the terminal among the available resources, or determining antennas available for wireless charging based on the usage of antennas of the base station; and determining an antenna for wirelessly charging the terminal among the antennas available for wireless charging.

14. The method of claim 11, wherein the radio charging assistance information comprises spatial state information of the terminal, and determining whether to wirelessly charge the terminal based on the radio charging assistance information comprises:

determining an efficiency for wirelessly charging the terminal based on spatial state information of the base station and the spatial state information of the terminal; and determining to wirelessly charge the terminal in a case where the efficiency for wirelessly charging the terminal is higher than a preset efficiency.

15. The method of claim 11, further comprising:

sending the radio charging configuration to the terminal in a case where the radio charging configuration for wirelessly charging the terminal is determined.

16. The method of claim 15, wherein the radio charging configuration is carried in at least one of:

a radio resource control layer signaling, a medium access control layer signaling, a physical layer signaling, a radio access control reconfiguration signaling, a radio access control setup signaling, a radio access control reestablishment signaling, or a radio access control resume signaling.

17. A communication device, comprising:

a processor; and a memory storing a computer program;

wherein the processor is configured to implement the method for receiving the request according to claim 10.

18. A non-transitory computer readable storage medium having stored therein a computer program, wherein the computer program, when executed by a processor, causes steps in the method for receiving the request according to claim 10 to be implemented.

19. A communication device, comprising:

a processor; and a memory storing a computer program;

wherein the processor is configured to:

send a radio charging request to a base station, wherein the radio charging request is configured to request the base station to wirelessly charge the communication device, the radio charging request carries radio charging assistance information, the radio charging assistance information is configured to assist the base station to wirelessly charge the communication device, the radio charging assistance information comprises a radio charging capability, and the radio charging capability comprises one or more of: a radio charging power, a radio charging frequency domain resource, or a radio charging time domain resource, wherein the radio charging capability is configured to assist the base station to determine whether a radio charging capability of the base station matches the radio charging capability of the terminal, and determine to wirelessly charge the terminal in a case where the radio charging capability of the base station matches the radio charging capability of the terminal.

* * * * *